(12) United States Patent
Kachmar

(10) Patent No.: US 7,869,678 B2
(45) Date of Patent: Jan. 11, 2011

(54) TELECOMMUNICATIONS CABLE JACKET ADAPTED FOR POST-EXTRUSION INSERTION OF OPTICAL FIBER AND METHODS FOR MANUFACTURING THE SAME

(75) Inventor: Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 276 days.

(21) Appl. No.: 12/242,162

(22) Filed: Sep. 30, 2008

(65) Prior Publication Data

US 2009/0031758 A1 Feb. 5, 2009

Related U.S. Application Data

(63) Continuation of application No. 11/757,680, filed on Jun. 4, 2007, now abandoned, which is a continuation of application No. 11/056,380, filed on Feb. 11, 2005, now Pat. No. 7,225,534.

(51) Int. Cl.
*G02B 6/44* (2006.01)
*H01R 43/00* (2006.01)

(52) U.S. Cl. .................. 385/103; 385/100; 385/102; 385/113; 29/855

(58) Field of Classification Search .......... None
See application file for complete search history.

(56) References Cited

U.S. PATENT DOCUMENTS

| | | | |
|---|---|---|---|
| 4,201,607 A * | 5/1980 | Rautenberg et al. ........... 156/70 |
| 4,212,097 A * | 7/1980 | Portinari et al. ............... 29/450 |
| 4,237,687 A | 12/1980 | de Vecchis et al. | |
| 4,272,472 A * | 6/1981 | Hulin et al. .................. 264/146 |
| 4,279,470 A * | 7/1981 | Portinari et al. ............. 385/111 |
| 4,577,925 A | 3/1986 | Winter et al. | |
| 4,593,442 A * | 6/1986 | Wright et al. ................. 29/235 |
| 5,007,703 A | 4/1991 | Hale et al. | |
| 5,109,458 A | 4/1992 | Dixit et al. | |
| 5,238,172 A | 8/1993 | Le Davay | |
| 5,306,868 A | 4/1994 | Faust et al. | |
| 5,339,058 A * | 8/1994 | Lique .......................... 333/237 |
| 5,975,404 A | 11/1999 | Ziemek et al. | |
| 6,236,790 B1 | 5/2001 | Okada et al. | |
| 6,618,526 B2 | 9/2003 | Jackman et al. | |
| 6,658,187 B2 | 12/2003 | Militaru | |
| 6,744,954 B1 * | 6/2004 | Tanaka et al. ............... 385/113 |
| 7,098,405 B2 | 8/2006 | Glew | |
| 7,225,534 B2 * | 6/2007 | Kachmar ...................... 29/825 |
| 2001/0029814 A1 * | 10/2001 | Tiano ........................... 81/119 |
| 2006/0179651 A1 * | 8/2006 | Kachmar ...................... 29/825 |
| 2007/0230880 A1 * | 10/2007 | Kachmar .................... 385/103 |

FOREIGN PATENT DOCUMENTS

| JP | 55095906 A | 7/1980 |
|---|---|---|
| JP | 61233708 A | 10/1986 |

\* cited by examiner

*Primary Examiner*—Michelle R Connelly Cushwa
(74) *Attorney, Agent, or Firm*—Merchant & Gould, P.C.

(57) ABSTRACT

The present disclosure relates to a telecommunications cable having a jacket including a feature for allowing post-extrusion insertion of an optical fiber or other signal-transmitting member. The present disclosure also relates to a method for making a telecommunications cable having a jacket including a feature for allowing post-extrusion insertion of an optical fiber or other signal-transmitting member.

21 Claims, 8 Drawing Sheets

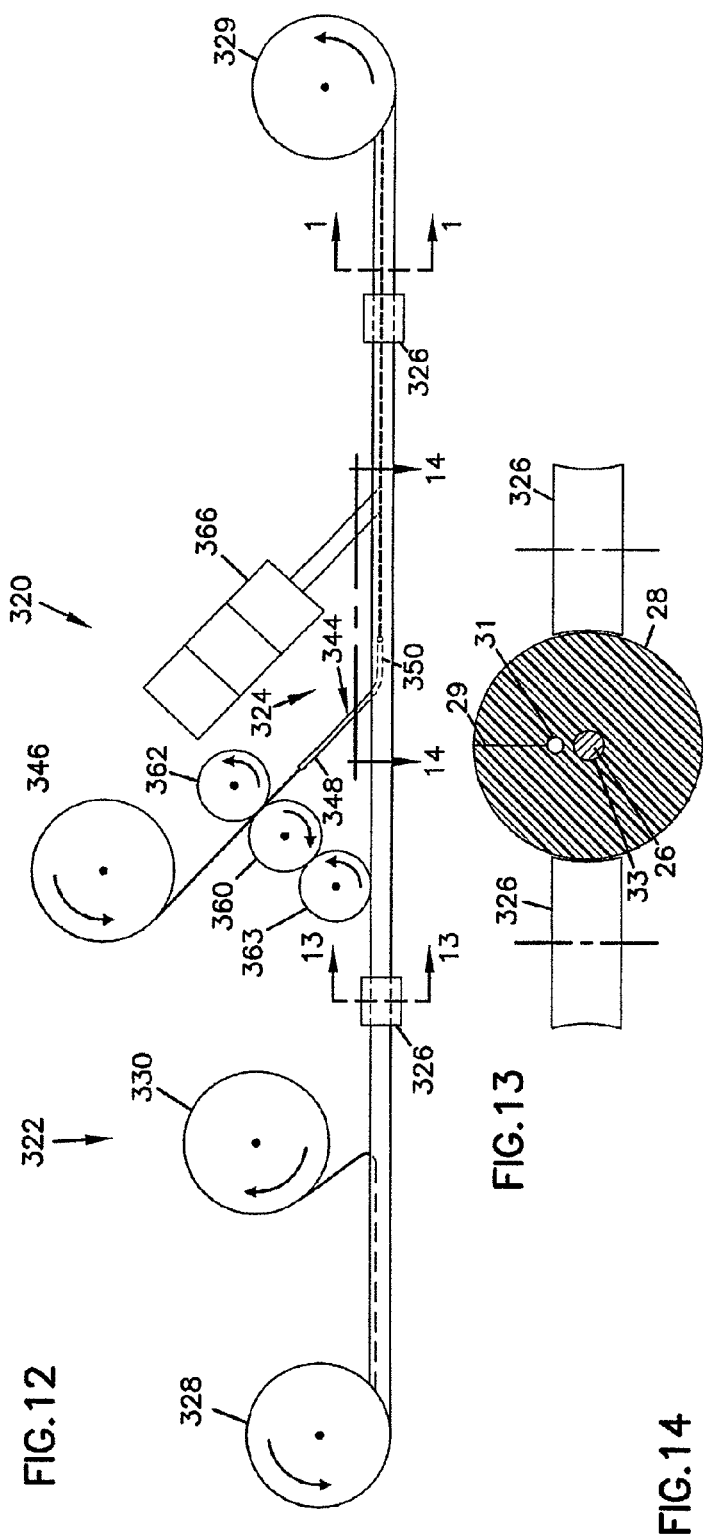
FIG. 12
FIG. 13
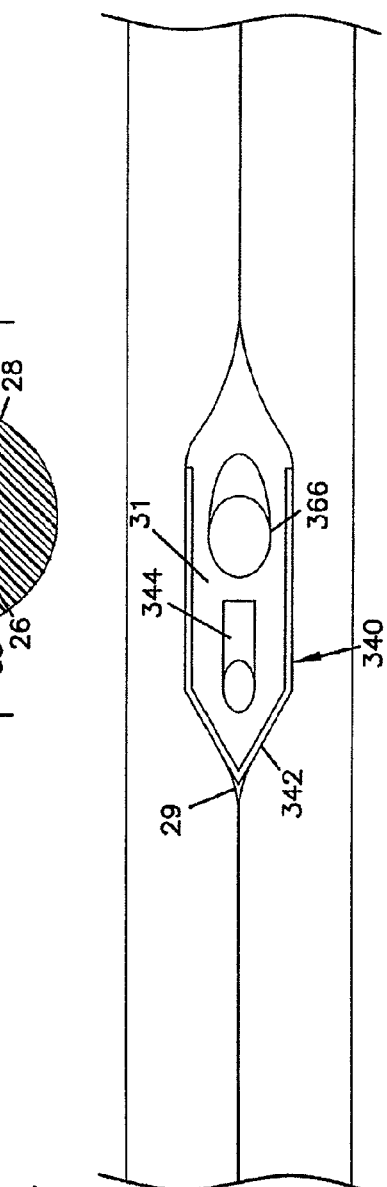
FIG. 14

US 7,869,678 B2

TELECOMMUNICATIONS CABLE JACKET ADAPTED FOR POST-EXTRUSION INSERTION OF OPTICAL FIBER AND METHODS FOR MANUFACTURING THE SAME

CROSS-REFERENCE TO RELATED APPLICATIONS

This application is a continuation of application Ser. No. 11/757,680, filed Jun. 4, 2007, which is a continuation of application Ser. No. 11/056,380, filed Feb. 11, 2005, now U.S. Pat. No. 7,225,534, which applications are incorporated herein by reference.

TECHNICAL FIELD

The present disclosure relates generally telecommunications cable for transmitting data and to methods for manufacturing telecommunications cable.

BACKGROUND

A fiber optic cable typically includes: (1) a fiber or fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

It is well known that micro-bending of an optical fiber within a cable will negatively affect optical performance. Shrinkage of the outer jacket of a fiber optic cable can cause axial stress to be applied to the optical fiber, which causes micro-bending of the optical fiber. One cause of jacket shrinkage is thermal contraction caused by decreases in temperature. For example, fiber optic cables are typically manufactured using an extrusion process. After a given cable has been extruded, the cable is passed through a cooling bath. As the cable cools, the jacket can contract more than the internal optical fiber or fibers causing micro-bending of the fiber or fibers.

SUMMARY

One aspect of the present disclosure relates to a telecommunications cable having a jacket including a feature for allowing post-extrusion insertion of an optical fiber or other signal-transmitting member.

Another aspect of the present disclosure relates to a method for making a telecommunications cable having a jacket including a feature for allowing post-extrusion insertion of an optical fiber or other signal-transmitting member.

A variety of other aspects are set forth in the description that follows. The aspects relate to individual features as well as to combinations of features. It is to be understood that both the foregoing general description and the following detailed descriptions are exemplary and explanatory only and are not restrictive of the invention as claimed.

BRIEF DESCRIPTION OF THE DRAWINGS

FIG. 12 shows an example system for inserting optical fiber into the cable extruded at the system of FIG. 2;

FIG. 13 is a cross-sectional view taken along section line 13-13 of FIG. 12;

FIG. 14 is a cross-sectional view taken along section line 14-14 of FIG. 12;

DETAILED DESCRIPTION

The present disclosure relates generally to telecommunication cable jackets having features that facilitate the post-extrusion insertion of optical fibers into the jackets. Example features that facilitate the post-extrusion insertion of optical fibers include slits, predefined slit locations (e.g., perforations, partial slits, weakened regions, etc.). In certain embodiments, a ripcord can be pulled from a jacket to create a feature that facilitates the post extrusion insertion of optical fiber into the jacket. The present disclosure also relates to methods for manufacturing jackets having features for facilitating the post extrusion insertion of optical fibers, and also relates to methods for inserting optical fibers into jackets. While the various aspect of the present disclosure are particularly useful for fiber optic cables, the aspects are also applicable to other types of telecommunications cables (e.g., copper cables).

Figure 1:
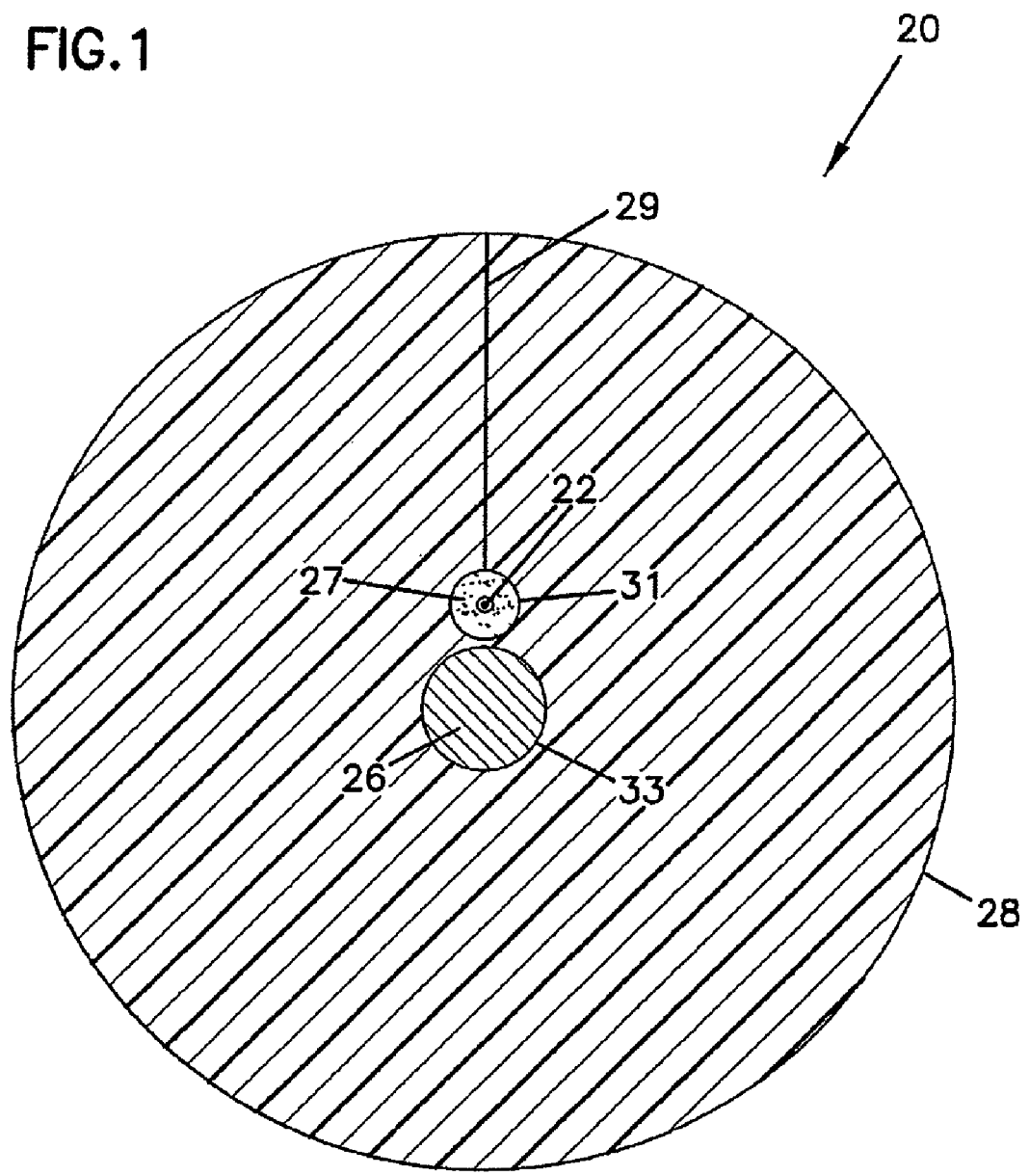
FIG. 1 is a cross-sectional view of an example fiber optic cable in accordance with the principles of the present disclosure, the cross-section is taken along section line 1-1 of FIG. 12.

FIG. 1 illustrates an example fiber optic cable 20 in accordance with the principles of the present disclosure. The fiber optic cable 20 includes an optical fiber 22, a strength structure 26 (e.g., one or more reinforcing members or layers), an optional filler 27 and a jacket 28. The jacket 28 includes an interior passage 31 (e.g., a hole) that runs along the length of the jacket 28. The optical fiber 22 is positioned within the interior passage 31. The jacket 28 also includes a slit 29 that runs along the length of the jacket for allowing the post-extrusion insertion of the optical fiber 22 into the interior passage 31 of the jacket 28. The jacket 28 further includes an interior passage 33 that runs parallel to the passage 31 for holding the strength structure 26.

It will be appreciated that the optical fiber 22 can have any number of conventional configurations. For example, the optical fiber 22 may include a silica-based core surrounded by a silica-based cladding having a lower index of refraction than the core. One or more protective polymeric coatings (e.g., ultraviolet curable acrylate) may surround the cladding. The optical fiber 22 may be a single-mode fiber or a multi-mode fiber. Example optical fibers are commercially available from Corning Inc. of Corning, N.Y. While only one fiber 22 is shown within the jacket 28, in other embodiments multiple fibers can be mounted within the jacket 28.

The fiber 22 is preferably an unbuffered fiber. However, buffered fibers could also be used. For example, the buffers can be made of a polymeric material such as polyvinyl chloride (PVC). Other polymeric materials (e.g., polyethylenes, polyurethanes, polypropylenes, polyvinylidene fluorides, ethylene vinyl acetate, nylon, polyester, or other materials) may also be used.

The strength structure 26 is adapted to inhibit axial tensile and/or compressive loading from being applied to the optical fiber 22. The strength structure 26 preferably extends the entire length of the fiber optic cable. In certain embodiments, the strength structure can include one or more reinforcing members such as yarns (e.g., aramid yarns), fibers, threads, tapes, films, epoxies, filaments, rods, or other structures. In a preferred embodiment, the strength structure 26 includes a reinforcing rod (e.g., a glass reinforced plastic rod having glass rovings in an epoxy base, a metal rod, a liquid crystal polymer rod, etc.) that extends lengthwise along the entire length of the cable.

The filler 27 is optional and functions to fill void areas within the jacket. The filler 27 would typically be used for cables designed for environments where water intrusion is a concern. By filling the voids around and between the fibers, the filler prevents water from entering the voids. Example fillers include thixotropic gels, petrolatum compounds. In certain embodiments, the filler can have adhesive properties that assist in sealing the slit and in holding the slit closed after the fiber has been mounted within the jacket.

The slit 29 allows the jacket 28 to be spread-apart to allow the fiber 22 to be inserted within the interior passage 31 of the jacket 28. After insertion of the fiber 22 into the passage 31, the slit can be held closed by the inherent mechanical properties of the jacket, which bias the slit to a closed position. Additional structure can also be used to assist in holding the slit 29 closed after insertion of the fiber. For example, adhesives or other bonding agents can be used to bond together the opposing portions of the jacket that define the slit 29. In other embodiments, a reinforcing sheath can be mounted over the jacket 28 after insertion of the optical fiber to prevent the slit from opening.

The jacket 28 is preferable manufactured from an extrudable base material such as an extrudable plastic material. Example base materials for the jacket include conventional thermoplastic polymers such as Alcryn® Melt-Processible Rubber sold by Advanced Polymer Alloys (a division of Ferro Corporation), polyethylene, polypropylene, ethylene-propylene, copolymers, polystyrene, and styrene copolymers, polyvinyl chloride, polyamide (nylon), polyesters such as polyethylene terephthalate, polyetheretherketone, polyphenylene sulfide, polyetherimide, polybutylene terephthalate, low smoke zero halogens polyolefins and polycarbonate, as well as other thermoplastic materials. Additives may also be added to the base material. Example additives include pigments, fillers, coupling agents, flame retardants, lubricants, plasticizers, ultraviolet stabilizers or other additives. The base material can also include combinations of the above materials as well as combinations of other materials.

Figure 2:
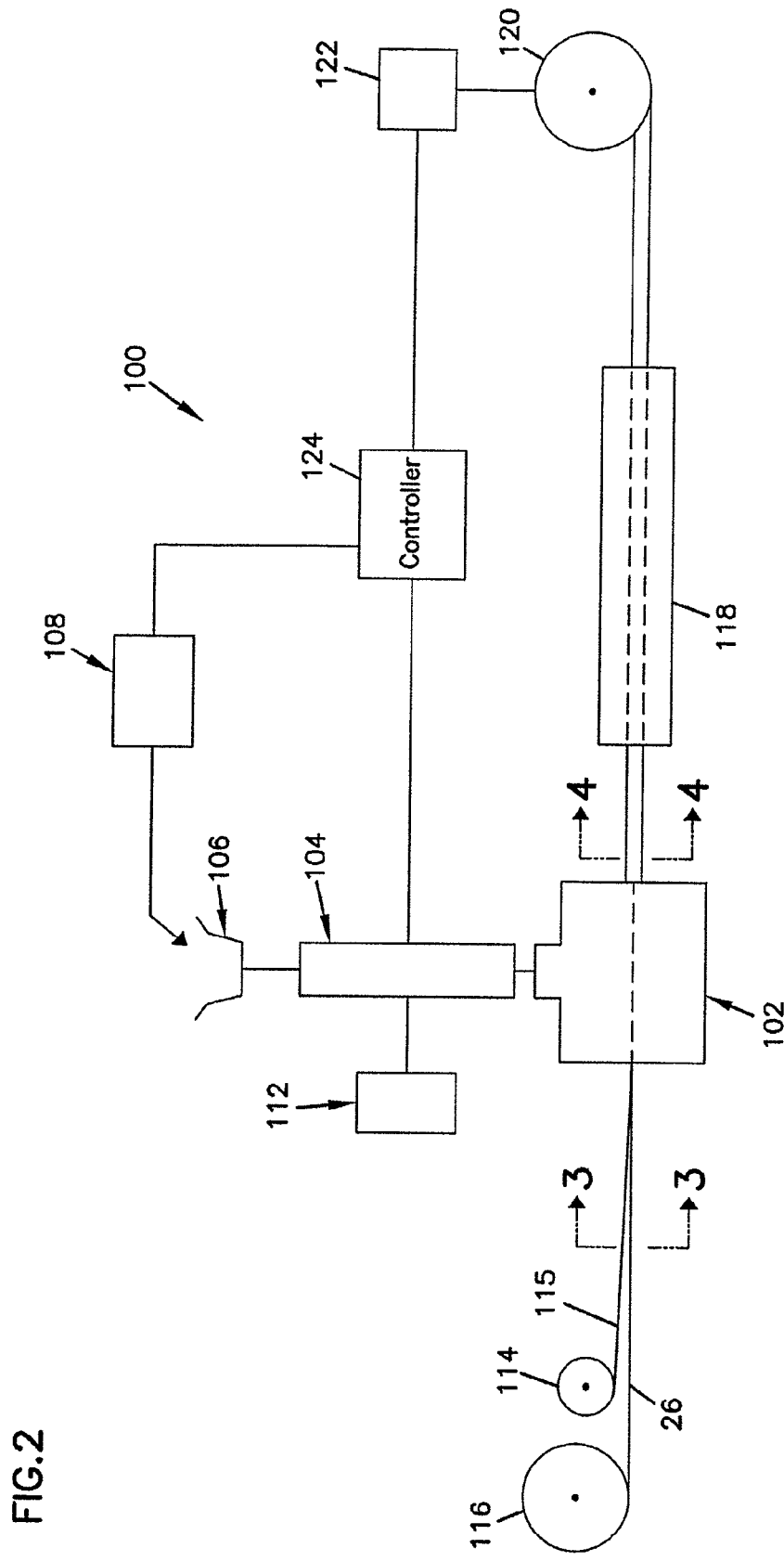
FIG. 2 illustrates an example system for extruding the fiber optic cable of FIG. 1.
Figure 3:
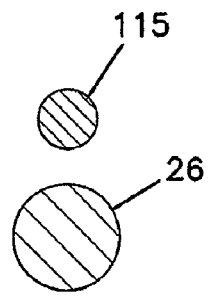
FIG. 3 is a cross-sectional view taken along section line 3-3 of FIG. 2.
Figure 4:
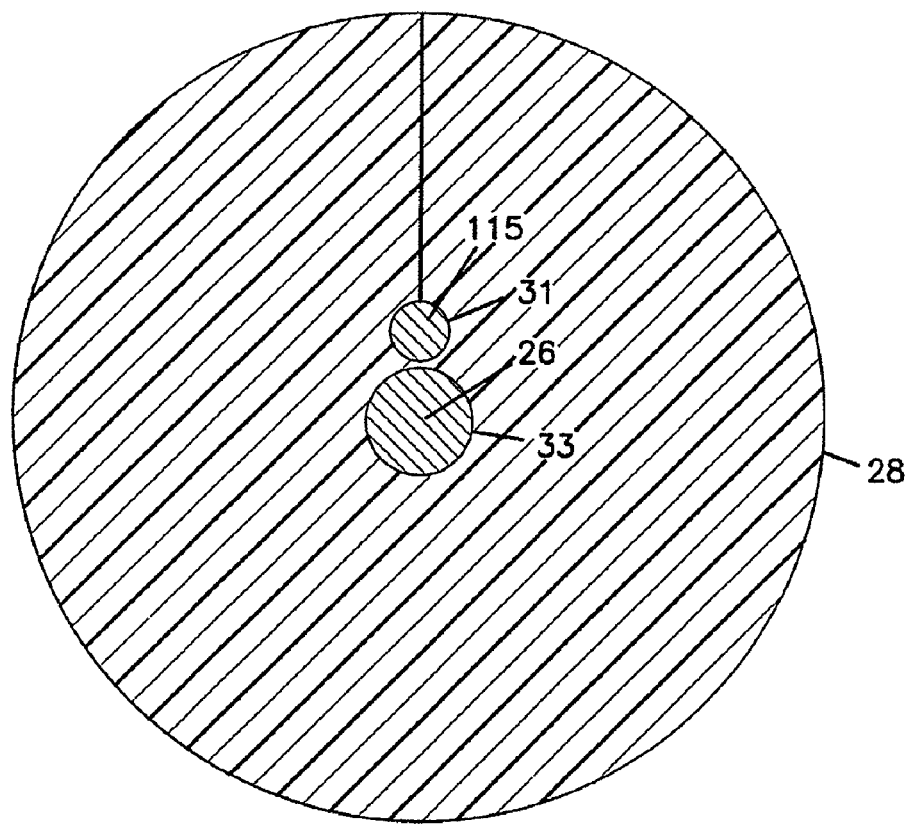
FIG. 4 is a cross-sectional view taken along section line 4-4 of FIG. 2.

FIG. 2 illustrates a system 100 for extruding the fiber optic cable 20 of FIG. 1. The system 100 includes a crosshead 102 that receives thermoplastic material from an extruder 104. A hopper 106 is used to feed materials into the extruder 104. A conveyor 108 conveys the material for the jacket 28 to the hopper 106. The extruder 104 is heated by a heating system 112 that may include one or more heating elements for heating zones of the extruder as well as the crosshead to desired processing temperatures. A rip member 115 (see FIGS. 2 and 3) is fed into the crosshead 102 from a feed roll 114. The rip member 115 is preferably a cord, strip, string, fiber or other elongated structure constructed of one or more component parts. Example materials for manufacturing the rip member 115 include aramid yarn, metal wire, polypropylene, extruded glass rod or other materials. A strength structure 26 (see FIGS. 2 and 3) is also fed into the crosshead from one or more feed rolls 116. A water trough 118 is located downstream from the crosshead 102 for cooling the extruded product (see FIG. 4) that exits the crosshead 102. The cooled final product is stored on a take-up roll 120 rotated by a drive mechanism 122. A controller 124 coordinates the operation of the various components of the system 100.

Figure 5:
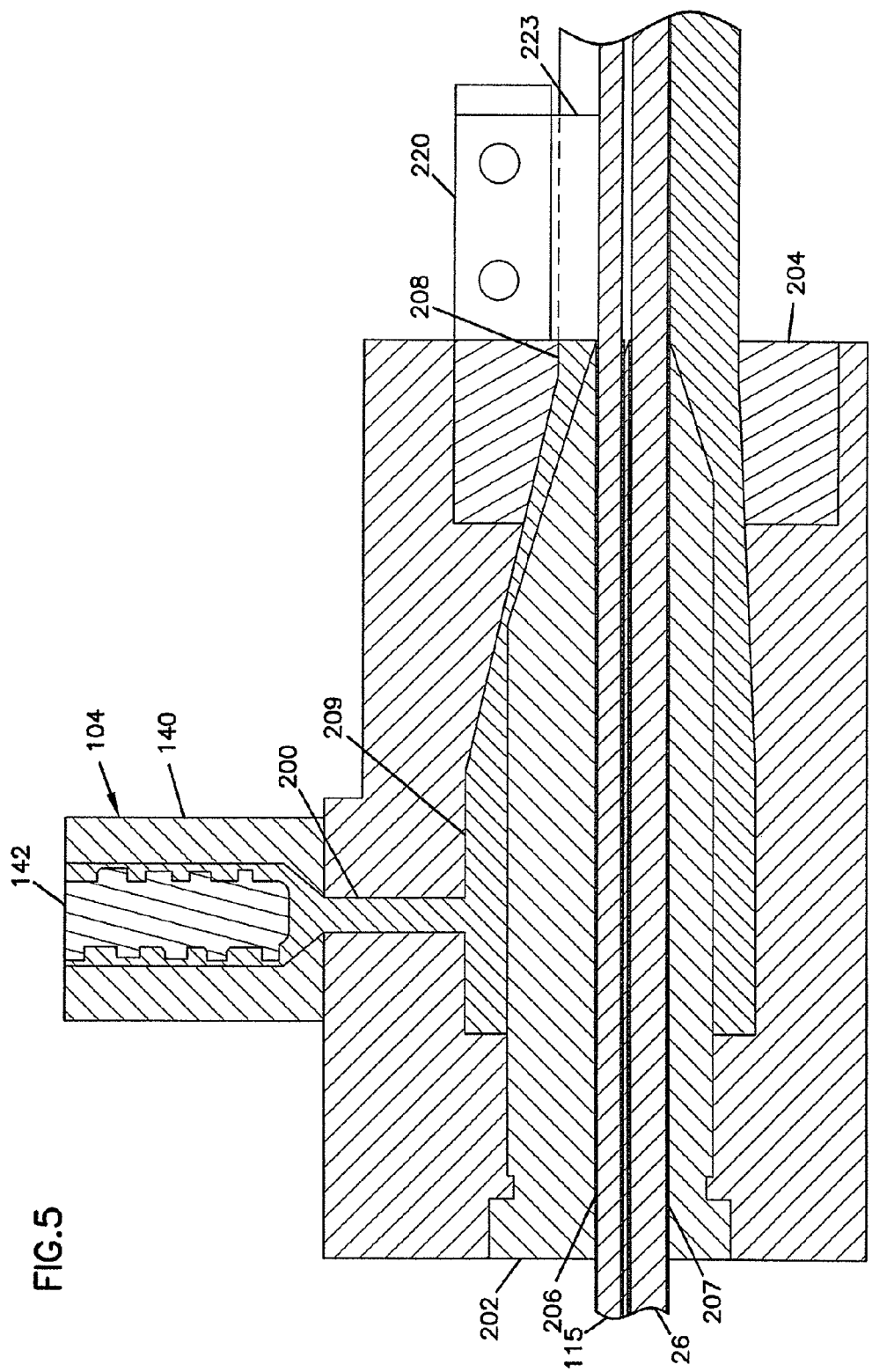
FIG. 5 shows an example crosshead that can be used with the system of FIG. 6.

Referring to FIG. 5, the extruder 104 is depicted as including an extruder barrel 140 and an auger/style extruder screw 142 positioned within the barrel 140. An extruder screen can be provided at the exit end of the extruder 104. The screen prevents pieces too large for extrusion from passing from the extruder into the crosshead 102.

Referring still to FIG. 5, the crosshead 102 includes a jacket material input location 200 that receives thermoplastic material from the extruder 104. A tip 202 (shown at FIGS. 5 and 9-11) and a die 204 (shown at FIGS. 5-8) are mounted at the crosshead 102. The tip 202 defines a first inner passageway 206 through which the rip member 115 is fed. The tip 202 also defines a second inner passageway 207 through which the strength structure 26 is fed. The second inner passageway is spaced below and generally parallel to the first inner passageway. The die 204 defines an annular extrusion passage 208 that surrounds the exterior of the tip 202. The crosshead 102 defines an annular passageway 209 for feeding the thermoplastic jacket material from the extruder 104 to the annular extrusion passage 208. Within the crosshead, the flow direction of the thermoplastic material turns 90 degrees relative to the flow direction of the extruder 104 to align with the direction of travel of the strength structure 26 and the rip member 115.

Figure 6:
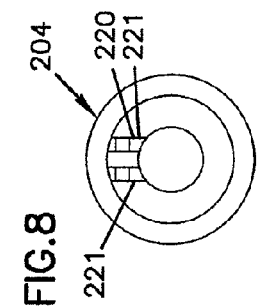
FIG. 6 is a side view of a die used with the crosshead of FIG. 5.
Figure 7:
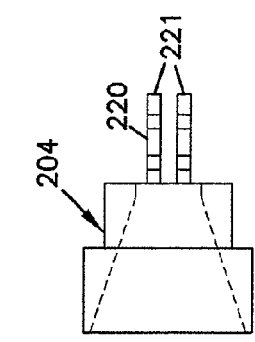
FIG. 7 is a top view of the die of FIG. 6.
Figure 9:
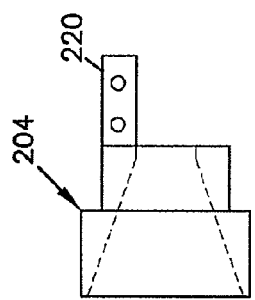
FIG. 9 is a side view of a tip used with the crosshead of FIG. 5.
Figure 8:
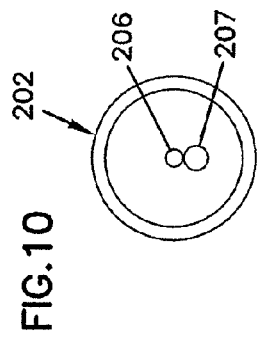
FIG. 8 is an end view of the die of FIG. 6.
Figure 10:
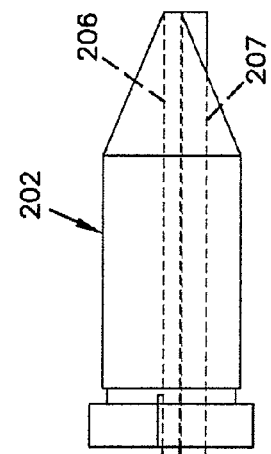
FIG. 10 is an end view of the tip of FIG. 9.
Figure 11:
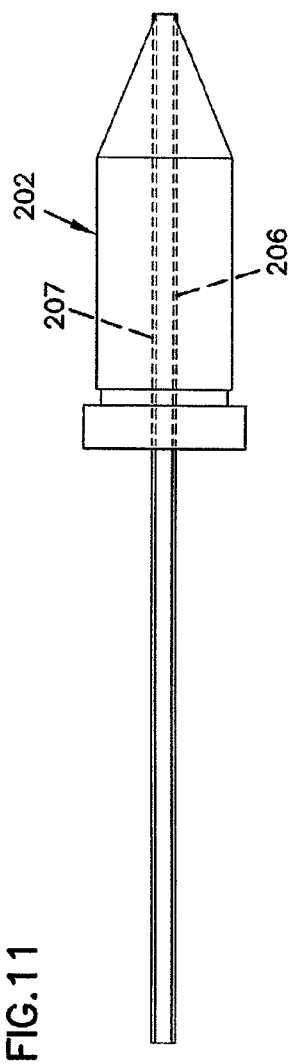
FIG. 11 is a top view of the tip of FIG. 9.

Referring to FIGS. 6-8, a slitting blade mount 220 is coupled to the die 204. The slitting blade mount 220 includes a pair of mounting plates 221 separated by a space 222 for receiving a slitting blade 223 (shown at FIG. 5). Fasteners such as screws or bolts can be inserted through openings 225 in the plates 221 to secure the blade 223 between the plates 221.

As shown at FIG. 5, the slitting blade 223 is mounted directly at the exit of the annular extrusion passage 208. As depicted, the blade 223 extends to the exterior surface of the rip member 115 so as to cut a slit that extends completely from the exterior of the jacket to the rip member 115. However, in other embodiments, the blade may extend only a partial distance between the exterior of the jacket and the exterior of the rip member 115.

In use of the system 100, the base material for the jacket and any additives are delivered to the hopper 106 by the conveyor 108. From the hopper 106, the material moves by gravity into the extruder 104. In the extruder 104, the material is mixed, masticated, and heated. The extruder 104 also functions to convey the material to the crosshead 102, and to provide pressure for forcing the material through the crosshead 102. As the material exits the crosshead 102, the material is forced between the tip and the die causing the material to be formed to a desired cross-sectional shape. For example, the material is formed with the passages 31, 33 (see FIG. 4) in which the strength structure and the rip member are positioned. After passing between the tip and the die, the material is cut/slit by the slitting blade 223. Because the material is still relatively molten when cut, the surfaces defining the slit may adhere slightly back together after being slit. However, at the very least, the slitting blade provides a weakened region (i.e., a pre-defined slit location) corresponding to the slit.

The extrusion process can be a pressure or semi-pressure extrusion process where product leaves the crosshead at the desired shape, or an annular extrusion process where the product is drawn down after extrusion. After cooling, the product is collected on the take-up roller 120.

FIG. 12 shows an example system 320 for inserting optical fiber (or other type of signal conveying member) into the cable extruded at the system of FIG. 2. The system 320 includes a rip member removal station 322 and a fiber insertion station 324. Before the cable from the system of FIG. 2 is processed at the system of FIG. 3, it can be cycled through temperature variations to remove internal stress from the jacket material.

Referring to FIGS. 12 and 13, the system 320 includes two sets of pinch rollers 326 that assist in moving the cable through the optical fiber insertion station 324. The cable is pinched between the rollers 326 and the rollers are driven to control the position of the cable. Feed and take-up rollers 328, 329 also assist in controlling the position of the cable.

The rip member removal station 322 includes a driven roller 330 that pulls the rip member 315 from the cable as the cable is moved through the system 320. As the rip member 315 is removed from the cable, the jacket of the cable tears/rips along the pre-defined slit location thereby breaking any bonds between the opposing walls of the slit that may have occurred after the slitting process. In alternative embodiments, the removal of the rip member 315 may be a manual process.

The optical fiber insertion station 324 includes a spreading shoe 340 (see FIG. 14) having a spreader 342 (e.g., a v-shaped plow or other structure having angled surfaces/ramps) that spreads apart the slit in the cable as shown at FIG. 14. The insertion station 324 also includes an insertion tool 344 that receives optical fiber from an optical fiber feed roll 346. The insertion tool 344 includes an angled receiving portion 348 and a bent tip 350. The bent tip 350 fits through the slit 29 and into the passage 31 of the cable. The tip 350 preferably co-axially aligns with the passage 31 of the cable jacket. A pair of pinch rollers 360, 362 pushes the optical fiber into the insertion tool 344. The optical fiber is frictionally pinched between the rollers 360, 362. The rollers 360, 362 are driven by a drive roller 363 that engages the cable being processed by the system. Movement of the cable causes rotation of the drive roller 363 that, in turn, causes rotation of rollers 360, 362. This feed configuration ensures that the optical fiber and the cable are fed though the system at the same linear speed.

The optical fiber insertion station 324 also includes an optional filler injection tool 366 for injecting filler into the passage 31. As shown at FIG. 12, the tool 366 includes a syringe having a needle that extends into the passage 31 through the slit 31. In other embodiments, an adhesive application station could be placed downstream of the filler injection tool 366 to apply adhesive to the jacket for the purpose of sealing and bonding the slit closed. In still other embodiments, a sheathing station can be placed downstream of the insertion station for applying an outer sheath about the jacket for protecting the jacket and for holding the slit closed.

In use, the cable is fed from feed roller 328 and moved through the system in a controlled manner by rollers 326. At the rip member removal station 322, the rip member 315 is torn from the jacket to ensure that the slit is fully open. Thereafter, at the fiber insertion station 324, the slit is spread open and the optical fiber is fed into the interior passage 31 of the jacket through the slit 29. Filler is then injected into the slit. The slit is then allowed to self-close, and the cable is collected at roller 329.

Figure 15:
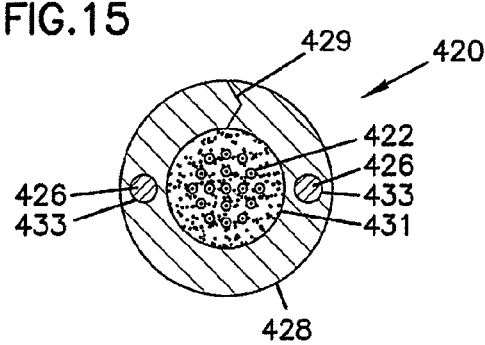
FIG. 15 is a cross-sectional view of another example fiber optic cable in accordance with the principles of the present disclosure.

FIG. 15 illustrates an example fiber optic cable 420 in accordance with the principles of the present disclosure. The fiber optic cable 420 includes a plurality of buffered optical fibers 422, a plurality of strength structures 426 and a jacket 428. The jacket 428 includes a relatively large central passage 431 that runs along the length of the jacket 428. The optical fibers 422 as well as optional fillers are positioned within the central passage 431. The jacket 428 also includes a slit 429 that runs along the length of the jacket for allowing the post-extrusion insertion of the optical fibers 422 into the passage 431 of the jacket 428. The jacket 428 further includes interior passages 433 that run parallel to the passage 431 for holding the strength structure 426. The components of the cable 420 can be constructed of the same or similar types of material described with respect to the embodiment of FIG. 1.

The slit 429 is depicted having a V-shaped cross-section that provides a nested interlock for mechanically holding the opposing surface of the slit in alignment with one another. In other embodiments, different types of interlock configurations (e.g., hooks, latches, etc.) can be used. In certain embodiments, the fibers 422 occupy less than half the volume of the passage 431 to facilitate movement between the fibers during bending. In certain embodiments, the fibers are not in contact with the surface of the jacket defining the passage 431. In certain embodiments, the fibers are not stranded. The passage is preferably adjacent the center of the cable.

In one embodiment, the cable 420 can be manufactured by a process similar the process use to make the embodiment of FIG. 1. For example, the cable can initially be extruded through a crosshead, and then a bundle of optical fibers can subsequently be inserted into the cable after extrusion using an insertion system of the type shown at FIG. 12.

Figure 16:
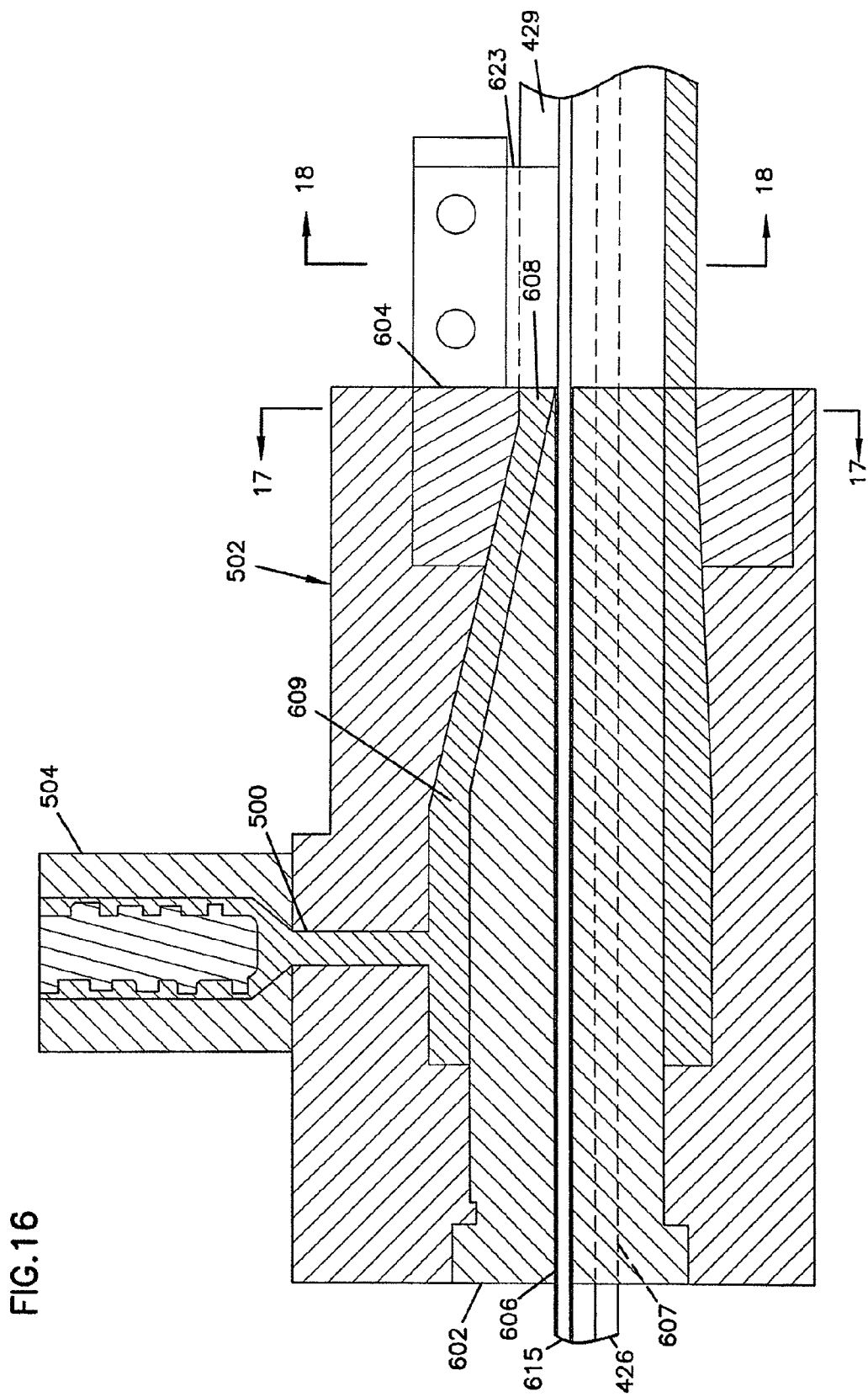
FIG. 16 is a cross-sectional view of an example crosshead used to extrude the fiber optic cable of FIG. 15.

FIG. 16 shows an example crosshead 502 suitable for extruding the cable 420 of FIG. 15. The crosshead 502 includes a jacket material input location 500 that receives thermoplastic material from an extruder 504. A tip 602 and a die 604 are mounted at the crosshead 502. The tip 602 defines a first inner passageway 606 through which a rip member 615 (see FIGS. 16 and 17) is fed. The tip 602 also defines second and third inner passageways 607, 611 through which the strength structures 426 are fed. The die 604 defines an annular extrusion passage 608 that surrounds the exterior of the tip 602. The crosshead 502 defines an annular passageway 609 for feeding the thermoplastic jacket material from the extruder 504 to the annular extrusion passage 608. Within the crosshead, the flow direction of the thermoplastic material turns 90 degrees relative to the flow direction of the extruder 504 to align with the direction of travel of the strength structures 426 and the rip member 615.

Figure 17:
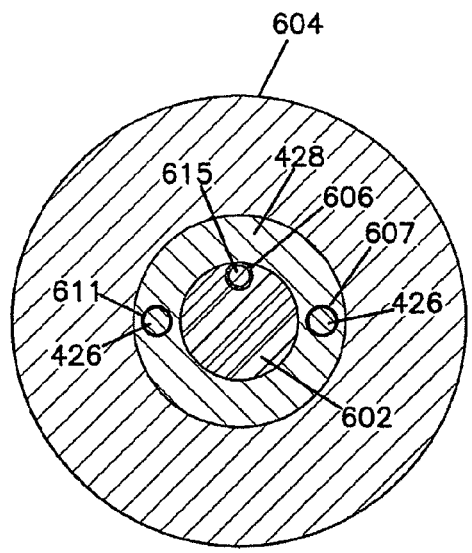
FIG. 17 is a cross-sectional view taken along section line 17-17 of FIG. 16.
Figure 18:
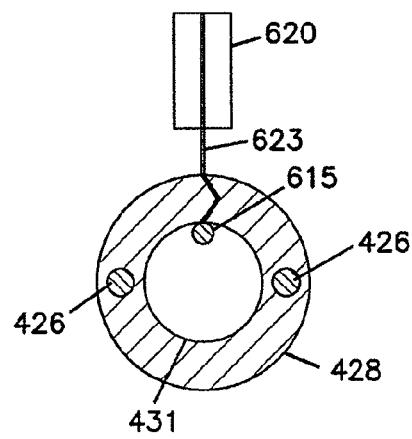
FIG. 18 is a cross-sectional view taken along section line 18-18 of FIG. 16.

Referring to FIG. 17, a slitting blade mount 620 is coupled to the die 604. A blade 623 having a v-shaped cross-section is mounted to the blade mount 620 at a location adjacent the exit of the crosshead 502. The blade 623 functions to cut the predefined slit location for the slit 429 into the jacket of the cable 420 as the cable exits the crosshead 502. After extrusion of the cable 420, the rip member 615 is pulled from the jacket to ensure that that the pre-defined slit location is opened to form the slit. Thereafter, the slit is spread apart to allow the bundle of optical fibers to be inserted into the central passage of the jacket.

Since many embodiments of the invention can be made without departing from the spirit and scope of the invention, the invention resides in the claims hereinafter appended and the broad inventive aspects underlying the specific embodiments disclosed herein.

What is claimed is:

1. A system for manufacturing a telecommunications cable including a strength structure and a rip member embedded within a jacket of the telecommunications cable, the system comprising:
    a cable jacket material input location;
    an extrusion crosshead, the extrusion crosshead including a tip having an exterior, the tip defining a first passageway configured to receive the strength structure and a second passageway generally parallel to the first passageway that is configured to receive the rip member, the extrusion crosshead also including a die defining an annular extrusion passage that surrounds the exterior of the tip, the annular extrusion passage in fluid communication with the cable jacket material input location; and
    a slitting blade configured for slitting the jacket as the jacket exits the extrusion crosshead, the slitting blade configured to cut a slit within the jacket that extends completely from an exterior of the jacket to the rip member.

2. A system according to claim 1, wherein the tip defines at least a third passageway parallel to the first and second passageways, the third passageway configured to receive a second strength structure.

3. A system according to claim 1, wherein the blade has at least a portion including a v-shaped cross-section.

4. A system according to claim 1, further comprising an extruder for providing cable jacket material to the cable jacket material input location, the extruder including an extruder barrel and an auger/style extruder screw.

5. A system according to claim 4, wherein the extruder is positioned generally perpendicular to the annular extrusion passageway of the extrusion crosshead.

6. A system for manufacturing a telecommunications cable including a rip member embedded within a jacket of the telecommunications cable, the system comprising:
    a cable feed station and a cable take-up station, wherein the cable feed station and the cable take-up station are configured to move the cable in a direction going from the cable feed station toward the cable take-up station;
    a rip member removal station located between the cable feed station and the cable take-up station, the rip member removal station including a roller that pulls the rip member from the cable to define a slit extending from an exterior of the jacket of the cable to an interior passage of the cable as the cable is moved between the cable feed station and the cable take-up station; and
    a signal transmitting member insertion station located between the rip member removal station and the cable take-up station, the signal transmitting member insertion station including a plow and an insertion tool, the plow configured to spread the slit as the cable is moved between the cable feed station and the cable take-up station, the insertion tool configured to extend into the interior passage of the cable for inserting the signal transmitting member into the interior passage.

7. A system according to claim 6, wherein the cable feed station includes a feed roller and the cable take-up station includes a cable take-up roller.

8. A system according to claim 6, wherein the signal transmitting member includes an optical fiber.

9. A system according to claim 8, wherein the signal transmitting member insertion station includes a fiber feed roll for providing the optical fiber and a pair of pinch rollers for pushing the optical fiber into the insertion tool.

10. A system according to claim 6, wherein the insertion tool includes an angled signal transmitting member receiving portion and a bent tip, the bent tip configured to fit through the slit and into the interior passage and coaxially align with the interior passage.

11. A system according to claim 6, further comprising a filler injection tool located between the signal transmitting member insertion station and the cable take-up station, the filler injection tool configured to inject filler into the interior passage after insertion of the signal transmitting member therein.

12. A method for manufacturing a telecommunications cable, the method comprising:
    extruding a cable jacket with a strength structure and a rip member embedded within the jacket, the cable jacket being extruded between a tip and a die;
    after extrusion, slitting the jacket with a blade located adjacent an exit end of the die to provide a predefined slit location;
    after slitting, pulling the rip member from the jacket through the predefined slit location to provide an access location to an interior passage of the jacket; and
    inserting an optical fiber into the interior passage of the jacket through the access location.

13. A method according to claim 12, wherein the step of inserting an optical fiber into the interior passage includes inserting a bundle of optical fibers.

14. A method according to claim 12, wherein a slitting blade is used to slit the jacket.

15. A method according to claim 14, wherein the slitting blade has a portion including a generally v-shaped cross-section.

16. A method according to claim 14, wherein the slitting blade cuts a slit that extends completely from an exterior of the jacket to the rip member.

17. A method according to claim 12, wherein the cable jacket includes at least two strength structures embedded within the cable jacket.

18. A method according to claim 12, wherein the cable jacket is relatively molten when being slit with the blade.

19. A method according to claim 12, further comprising injecting a filler into the interior passage after the optical fiber is inserted into the interior passage.

20. A method according to claim 12, further comprising moving the jacket through a spreading station where the access location is spread apart to facilitate insertion of the signal transmitting member into the interior passage.

21. A method for inserting optical fiber into a jacket, the jacket including a pre-defined slit location that extends along a length of the jacket and a rip cord that extends along the predefined slit location, the method comprising:
    pulling the rip cord to provide a slit at the predefined slit location;
    inserting a plow through the slit to generate an open region of the slit that moves along the length of the jacket; and
    inserting the optical fiber into the jacket by inserting the optical fiber through the open region of the slit generated by the plow as the open region of the slit moves along the length of the jacket.

* * * * *